Figure 1:
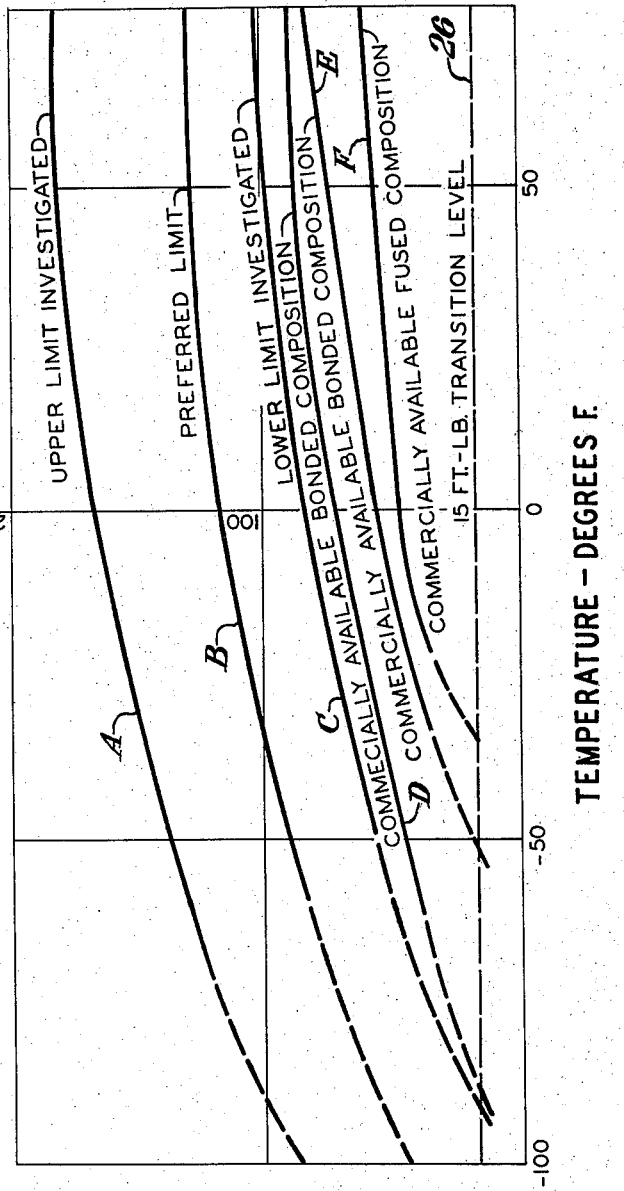

Aug. 13, 1963    R. A. KUBLI ETAL    3,100,829
SUBMERGED-MELT WELDING AND COMPOSITION THEREFOR
Filed Jan. 3, 1961    2 Sheets-Sheet 2

INVENTORS
ROBERT A. KUBLI
WILLIAM B. SHARAV
BY Barnwell R. King
ATTORNEY

United States Patent Office 3,100,829
Patented Aug. 13, 1963

3,100,829
SUBMERGED-MELT WELDING AND
COMPOSITION THEREFOR
Robert A. Kubli, Scotch Plains, and William B. Sharav, Short Hills, N.J., assignors to Union Carbide Corporation, a corporation of New York
Filed Jan. 3, 1961, Ser. No. 80,221
7 Claims. (Cl. 219—73)

The invention relates to submerged-melt welding, and particularly to improved welding compositions for making steel welds having high-impact properties even at low temperatures.

Submerged-arc or melt welding, as disclosed in U.S. Patent No. 2,043,960, involves the deposition of metal from a bare consumable electrode rod or wire under a blanket of granular welding composition. Such process has been widely accepted by virtue of advantages including speed, favorable properties, and mechanization.

According to the present invention there is provided a novel granular submerged-melt welding composition that contains the following ingredients:

| Material: | Range (by weight) |
| --- | --- |
| CaO | 33–55%. |
| $SiO_2$ | 30–45%. |
| MnO | 2–6%. |
| Cryolite | 4–15%=2–8%. |
| $TiO_2$ | Trace—10%. |
| FeO | Trace—1% (max.). |
| MgO | Trace—1% (max.). |
| $Al_2O_3$ | Trace—2% (max.). |
| $Na_2O$ | Trace—0.5% (max.). |

The invention also provides a method of submerged-arc welding of high-impact steel which comprises feeding a consumable steel electrode toward the work-in-circuit to be welded under a blanket of granular submerged-melt welding composition composed mainly of fused CaO and $SiO_2$ in which the $CaO/SiO_2$ ratio ranges between 0.80 and 1.8. Industrial requirements for weldments in structural type steels such as H–80, T–1, and nickel alloy steels demand greater impact properties at lower temperatures than were heretofore possible. Such weldments as pressure vessels, bridges, and heavy structures, particularly when subjected to relatively low temperatures, require as a prerequisite joined steel members which maintain relatively high-impact properties.

Conventional bonded welding compositions do not consistently and satisfactorily produce welds having high-impact properties. This is so, at least in part, because such compositions are usually provided with an alloying agent, such that weld chemistry has a tendency to vary with welding conditions and is especially sensitive to voltage fluctuations. More generally, however, the tendency for a bonded composition to absorb moisture from the atmosphere can result in hydrogen embrittlement of the metal, resulting in poor impact properties coupled with cracking. By use of the inventive composition, the difficulty of hydrogen embrittlement is considerably reduced, because exposure to the atmosphere results in much less absorption of moisture. Such is the case because the particles are fused and are of a homogeneous consistency.

Prior commercially available welding fluxes of the bonded and bonded alloy types for joining high-impact steels do not perform satisfactorily with multipower welding. Such welding practices are utilized when it is desired to increase metal deposition rates. At relatively high welding current values commercially available bonded fluxes seem to break down and do not form a properly protective shielding slag. With fused compositions, however, the current capacity is much greater and, therefore, the utility of the welding process is extended by our invention.

Prior to the present invention there has been no commercially available fused welding composition which met modern impact requirements. Linde "Unionmelt" Grade 80 (U.S. Patent Nos. 2,200,737 and 2,228,639) has customarily been used where good impact properties are desired, but it is not completely adequate. A serious economic result of this, as an example, is in the building of submarines with HY–80 steel. Mechanized submerged-arc welding in the past has been used extensively in shipbuilding because of its relatively low cost and consistently high quality. However, because of the lack of a suitable composition, such process could not be used in welding sumbarines made with HY–80 steel. As a consequence, coated stick electrodes, manually applied, have of necessity been used at great economic sacrifice. The invention fills this urgent need.

The primary object of this invention is to provide a fused submerged-melt welding composition that is capable of successfully producing high quality welded joints having the ability to withstand relatively high-impact forces, especially at relatively low temperatures.

Another object is to provide a welding composition for use with alloyed welding wires which renders the weld chemistry relatively independent of arc voltage fluctuations and still provides the alloy content required to attain specific tensile levels for specific steels.

A further object is to provide a fused composition capable of accepting supplementary weld-alloy additions such as nickel and the oxides of chromium and molybdenum.

The preferred granular composition according to the invention is composed of:

| Material: | Weight |
| --- | --- |
| CaO | 44%. |
| $SiO_2$ | 41%. |
| MnO | 4%. |
| Cryolite | 8%=4% F. |
| $TiO_2$ | 1%. |
| FeO | 1% (max.). |
| MgO | 1% (max.). |
| $Al_2O_3$ | 2% (max.). |
| $Na_2O$ | 0.5% (max.). |

Figure 2:
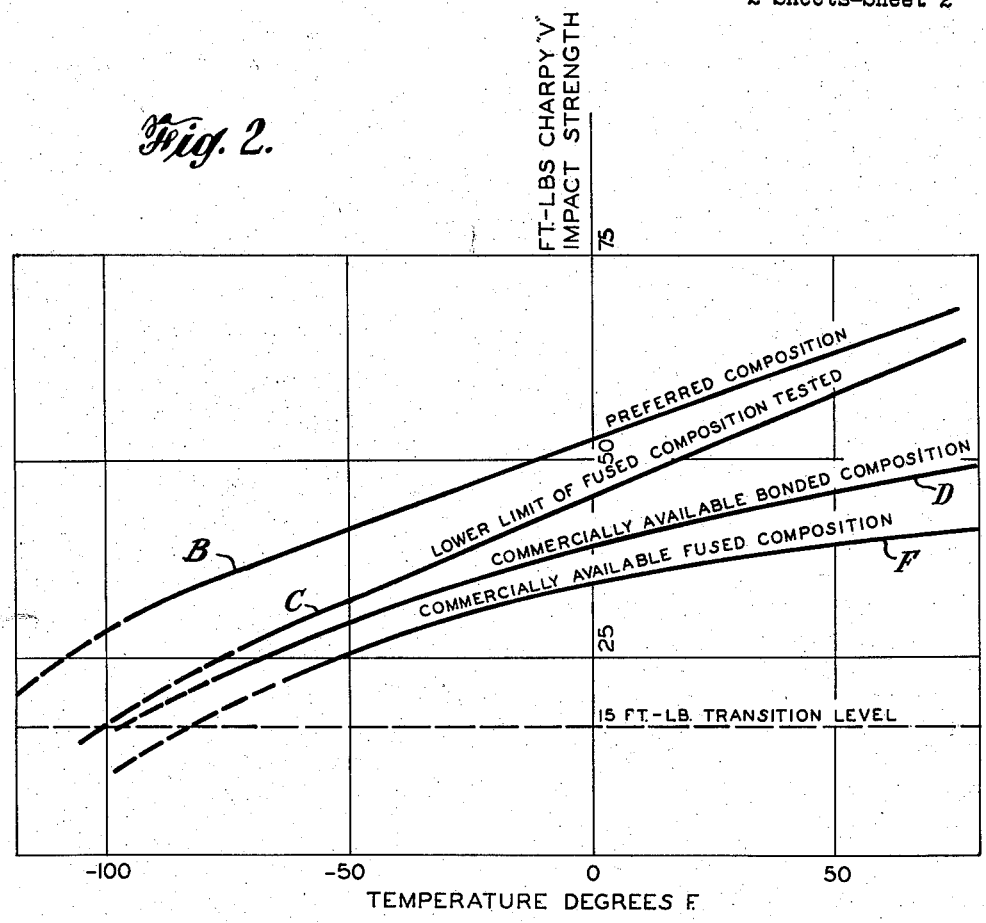
Figure 3:
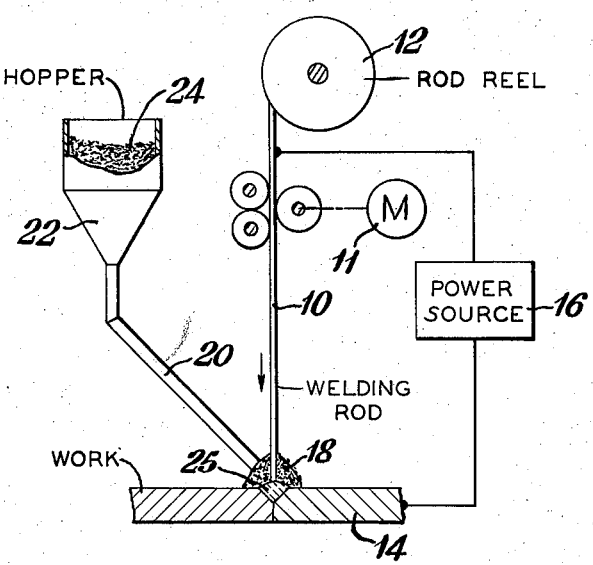

In the drawings:

FIGS. 1 and 2 are graphical representations of impact strength vs. temperature of various welds; and, FIG. 3 is a diagram of a submerged-melt welding set-up illustrating the invention.

The notch toughness or impact resistance of steel is a function of the temperature at which testing is performed. Characteristically, carbon and low-alloy steels exhibit their maximum energy absorption levels at room temperature and above. At lower temperatures impact resistance decreases. During such change in the impact properties of steel, there exists a temperature range wherein a transition from ductile to brittle failure exists. Such temperature is a useful index to metallurgists, since steel subjected to impact loads at and below the transition temperature can fail suddenly and catastrophically.

A further consideration in an examination of impact properties is the effect of the desired tensile levels upon the impact properties of the steel. Usually, as the tensile strength of the steel is raised, a significant decrease in impact resistance is experienced. Hence, for a careful evaluation it is necessary to consider the tensile level when studying impact resistance levels.

The development of fused welding compositions for producing steel welds with high-impact properties must proceed largely along empirical and intuitive lines, because little is known scientifically exactly as to what controls impact properties. Weld metal chemical analysis is a factor, but identical analyses can occur in welds with totally different impact properties. Likewise, grain size and microstructure of the weld are factors, but steels which from observation and analysis appear identical in all or most other respects still differ widely in impact properties.

Wollastonite, as suggested by U.S. Patent No. 2,269,167, has been used with some success as a principal constituent for arc welding rod coatings and has also, with some limited success, been applied to welding fluxes for submerged-arc welding. In the latter case, such welding compositions as heretofore formulated have lacked desirable welding characteristics while at the same time exhibiting good, but not completely adequate, impact properties such as those desired for present day commercial demands. Our way of approaching a solution to the problem is to vary the welding composition by changing the $CaO:SiO_2$ ratio. These two constituents occur in the mineral Wollastonite, or calcium metasilicate, $CaSiO_3$, which has a nominal stoichiometric $CaO:SiO_2$ ratio by weight of approximately 0.93.

In addition to obtaining good impact properties in the weld metal, a concomitant problem in the development of a satisfactory composition is to maintain good weldability in the use of the composition. In other words, the composition to be useful should produce welds free from surface and other defects and the welds must have good mechanical properties.

The allowable changes in the $CaO:SiO_2$ ratio in a composition formulation are principally governed in an essentially binary system by the limit at which the material no longer can be made to lend itself to favorable welding. Outside such limit, it becomes necessary to maintain good weldability by adding other constituents. As a result of such judicious and perhaps fortuitous addition, the $CaO:SiO_2$ ratio can be changed if the newly added constituents contribute to improved weldability, without at the same time introducing excessive detrimental characteristics to the weld metal properties.

A series of multipass welds (using the submerged-arc welding process) were made by us upon commercially available carbon, Carilloy T-1, and HY-80 steels using both bonded and fused compositions (of which the inventive composition is one). When desired, stress relieving was carried out at 1050–1100 degs. F. for quenched and tempered steels, and 1200 degs. F. for carbon steel for a period of one hr./in. of thickness.

As shown in FIG. 3, in our process an electrode 10 of rod or wire is drawn by a feed motor 11 from a reel 12 and fed toward the work 14 as welding current from a power source 16 melts the end of such electrode and adjacent work metal under a blanket 18 of granular composition. The latter is delivered to the welding site by a pipe 20 from a hopper 22 containing a supply 24 thereof. A seam weld 25 in the work 14 is thereby produced.

The mechanical impact properties of several welds were evaluated for steel compositions providing two different tensile levels; namely, 75,000 p.s.i. and 100,000 p.s.i. In so doing, all compositions (including the inventive fused composition) tested at the 75,000 p.s.i. level used a suitable, commercially available steel welding electrode of the manganese-molybdenum type. For the tensile level of 100,000 p.s.i., special alloy welding electrodes of the manganese-molybdenum-nickel type were used.

The impact resistance of such welds was measured in terms of the ability of a welded joint to absorb a sudden blow of unusual intensity without failure. The standard Charpy V notch impact test provided a basis for measuring this mechanical property of the welded joint.

FIGS. 1 and 2 trace a family of impact vs. temperature curves for (1) the preferred fused inventive composition (Trace B), (2) two other experimental fused compositions (Traces A and C), (3) the best prior standard commercially available fused composition, Grade 80 (Trace F), and (4) two prior commercially available bonded compositions (Traces D and E). An energy absorption level (broken line 26) of 15 ft./lb. is shown as the specified reference of transition temperature level to brittle fracture.

As shown in FIG. 1, for steels of 75,000 p.s.i. tensile strength, the energy level of curve A for welds made with one composition is considerably greater than that with the other compositions tested. Said composition is the upper limit extensively investigated within the range of the fused compositions under consideration. Its $CaO:SiO_2$ ratio of 1.8 is greater than that of the other compositions including the one corresponding to curve B at a ratio of 1.06 which is the preferred composition. Composition resulting in curve A exhibited the most desirable transition temperature of the group studied. However, its welding characteristics are relatively poor, compared to the preferred composition, leading to a lack of reproducibility. Trace C represents a $CaO:SiO_2$ ratio of 0.89 and is seen to be significantly less effective than curve B of the preferred composition.

The preferred inventive composition (Trace B), having a $CaO:SiO_2$ ratio of 1.06 produced welds which exhibited very favorable energy absorption levels with consistently good welding characteristics. Impact resistance values with this preferred inventive composition at 0 degs. F. are double that of the standard commercially available fused composition (Trace F), and are about 50 percent higher than that of the commercial bonded compositions (Trace D).

The transition temperature range leading from ductile into brittle fracture (as represented by the extended broken lines) for the preferred composition (Trace B) and the extra high $CaO:SiO_2$ modified composition (Trace A) occurs at significantly lower temperatures than those for the other compositions studied. The curve preferred for the inventive composition (Trace B) does not intersect the 15 ft./lb. level even at temperatures as low as −100 degs. F. This composition has much better impact properties than the commercially available bonded and fused compositions (Traces D, E, F.)

FIG. 2 traces a family of curves similar to that of FIG. 1, but taken at the 100,000 p.s.i. tensile level. Generally, the curves reflect an overall decrease in the impact level as compared with the lower tensile level of 75,000 p.s.i. Nevertheless, the compositions maintain their relative positions.

Thus, it can be seen that impact properties of the weld joint sharply increase under the conditions prevailing in the testing as the ratio of $CaO:SiO_2$ advances from 0.8 to 1.8. The excess CaO present just above the stoichiometric ratio of 0.933 up to perhaps 1.2 appears to be of greatest benefit.

Optimum impact properties are obtained within a preferred CaO content range of from 33 to 55 percent, and an $SiO_2$ range of from 30 to 45 percent. Generally, desirable impact resistance and good weldability are developed when such constituents are present along with other minor additions in the welding composition in the $CaO:SiO_2$ ratio of from 0.93 to 1.4. Increasing the CaO content beyond the suggested range impairs the weldability of the composition, although impact properties may be somewhat enhanced. Less CaO than that indicated produced lower impact properties in the weld.

Cryolite ($Na_3AlF_6$) is preferred as the source of fluoride for the inventive composition. For example, when 8 percent cryolite is tested as a part of the inventive composition, impact values at −100 degs. F. are greater than those obtained with the composition using 6.8 percent calcium fluoride. The data are shown below:

| Composition | Yield Strenght, p.s.i. | Charpy "V", Ft./Lb. | | | |
|---|---|---|---|---|---|
| | | +70 | −50 | −60 | −100 |
| Type A (cryolite) | 59,000 | 99 | 70 | | 56 |
| Type B (CaF₂) | 56,000 | 68 | | 25 | 14 |

The optimum cryolite content range is from 4 to 15 percent of the total composition. Above this limit, the weldability of the composition is impaired; while with a lower amount, the composition impact resistance properties are impaired.

To again improve the weldability of the composition insofar as withstanding undesirable weld pocking and porosity, MnO is added to the composition. We have found that favorable welding characteristics are obtained when the MnO content range varies from between 2 and 10 percent.

The addition of titanium oxide to the inventive composition tends to impair the low temperature impact properties of the weld metal when added in excess of 10 percent. Room temperature impact properties, however, are improved with such additions. Additions ranging from 5 to 10 percent appear to be beneficial with regard to room temperature properties without adversely affecting low temperature properties. Compositions essentially free of titanium oxide, however, are less costly and have excellent impact properties at room and lower temperatures. The oxides of magnesium and iron appear to be deleterious and should be controlled such that their maximum values are no more than 1 percent each; whereas, aluminum oxide can be tolerated up to 2 percent of the total.

Some commercial submerged-arc welding compositions are produced by bonding selected oxides of calcium, silicon, magnesium, manganese, aluminum, zirconium, and titanium with sodium silicate. However, contrary to such accepted practice with such bonded compositions, we have found that any discrete amounts of sodium oxide or sodium silicate within the fused inventive composition does not enhance, but rather adversely affects the impact resistance of the weld metal. With this in mind, the inventive composition has as its upper limit 0.50 percent sodium oxide. Though certain prior commercially available compositions contain greater amounts of sodium oxide or sodium silicate, we have found that optimum impact resistance properties are obtained in fused compositions keeping such constituents at low levels.

The preferred and range of ingredients of the inventive composition are noted below:

| | Preferred, percent | Range, percent |
|---|---|---|
| CaO | 44, Ratio 1.07 | 33 to 55. |
| SiO₂ | 41 | 30 to 45. |
| MnO | 4 | 2 to 6. |
| Cryolite | 8 | 4 to 15. |
| TiO₂ | 1 (Max.) | Trace—10. |
| FeO | 1 (Max.) | Trace—1 (Max.). |
| MgO | 1 (Max.) | Trace—1 (Max.). |
| Al₂O₃ | 2 (Max.) | Trace—2 (Max.). |
| Na₂O | 0.5 (Max.) | Trace—0.5 (Max.). |

Selected amounts of chromium and molybdenum oxides may be added (by fusion) to the composition, without departing from our invention, in order to adjust the alloy content of the weld metal. The addition of such oxides is made primarily to increase tensile strength. In like manner, powdered nickel ranging from 1 to 4 percent may be added by bonding to the inventive composition with sodium silicate to afford higher tensile levels.

In the light of study made with such additives to the inventive composition, the chromium oxide content should not exceed 10 percent, whereas the molybdenum oxide level should not exceed 5 percent.

In considering the reasons behind the exceptionally superior performance of the inventive composition, the combination of the various elements in the inventive composition which yield favorable properties has been arrived at empirically. The precise mechanism, however, which yields the most favorable impact resistance properties is not understood by us. Nevertheless, welds made with the inventive composition were compared to the basic slag-making operation in open hearth steel production. Reactions such as desulphurizing and dephosphorizing occur in the fusion welding process of steel. The class of highly basic welding compositions, of which the inventive composition is one, enhances the desulphurizing reaction for it is known that high basicity is essential to any extensive elimination of undesirable phosphorus and sulphur. But, sulphur and phosphorus, in amounts maintained during welding operations carried out by us, do not appear to be correlated in any way to the results of such tests. Consequently, we cannot assume from our data that such constituents are significant governing factors, wherein favorable impact properties are obtained with the inventive composition.

Since the inclusions in weld metal are principally silicates, it is reasonable to expect that, when an appreciable lowering of the silicon content in the weld metal is realized, as with the inventive composition, a corresponding significant alteration in either silicate inclusion chemistry or microscopic dispersion within the weld has taken place. That this theory may have pertinent validity can be deduced from the data noted below wherein the silicon content varies from 10 to 20 points lower in that of the inventive composition as compared with a commercially available fused composition providing normal impact resistance properties.

*Weld Metal Compositions*

| | Fused Commercially Available Composition W/ Mn-MO Wire | Inventive High-Impact W/Mn-MO Wire |
|---|---|---|
| C | 0.06 | 0.07 |
| Mn | 0.88 | 0.67 |
| Si | 0.45 | 0.20 |
| P | 0.014 | 0.015 |
| S | 0.022 | 0.024 |

For D.C. "downhand" welding the composition of the invention preferably is in the form of grains all of which are capable of passing through a No. 12 Tyler screen. For A.C. and "position" D.C. welding according to the invention, all of the grains should be capable of passing through a No. 48 Tyler screen.

What is claimed is:

1. A fused submerged-melt welding composition for submerged-arc welding high-impact steels to produce high impact low temperature welds; said composition being composed mainly of CaO, SiO₂, with lesser amounts of MnO; 2%–8% fluoride; and a trace to 10% TiO₂; said CaO ranging between 33% and 55%, the SiO₂ between 30% and 45% and the MnO between 2% and 6%.

2. A fused submerged-melt welding composition as defined by claim 1, in which the CaO/SiO₂ ratio varies from 0.80 to 1.8, thereby improving the impact properties of the resulting weldment in high-impact steel.

3. A fused submerged-melt welding composition as defined by claim 2, composed of 44% CaO, 41% SiO₂, 4% MnO, 4% fluoride, 0.1% TiO₂, less than 5% oxide impurities, selected from the class consisting of FeO, MgO, Al₂O₃, and Na₂O.

4. A fused granular submerged-melt welding flux for submerged-arc welding having relatively high-impact properties even at relatively low temperatures, which is composed of the following:

| Material | |
|---|---|
| CaO | 44%. |
| SiO$_2$ | 41%. |
| MnO | 4%. |
| Cryolite | 8%. |
| TiO$_2$ | Trace—1% (max.). |
| FeO | Trace—1% max. |
| MgO | Trace—1% (max.). |
| Al$_2$O$_3$ | Trace—2% (max.). |
| Na$_2$O | Trace—0.5% (max.). |

5. A fused granular submerged-melt welding composition for making steel welds having relatively high impact properties even at relatively low temperatures, which is composed of the following:

| Material: | Range |
|---|---|
| CaO | 33 to 55%. |
| SiO$_2$ | 30 to 45%. |
| MnO | 2 to 6%. |
| Cryolite | 4 to 15%. |
| TiO$_2$ | Trace—10%. |
| FeO | Trace—1% (max.). |
| MgO | Trace—1% (max.). |
| Al$_2$O$_3$ | Trace—2% (max.). |
| Na$_2$O | Trace—0.5% (max.). | in the form of grains all of which are capable of passing through a No. 12 Tyler screen.

6. A fused granular submerged-melt welding flux as defined by claim 5, in which all of the grains are capable of passing through a No. 48 Tyler screen.

7. Submerged-arc welding of high-impact steel which comprises feeding a consumable steel electrode toward the work-in-circuit to be welded under a blanket of fused granular submerged-melt welding composition as defined by claim 6 in which the CaO/SiO$_2$ ratio ranges between 0.80 and 1.8.

References Cited in the file of this patent

UNITED STATES PATENTS

| | | |
|---|---|---|
| 2,200,737 | Clapp | May 14, 1940 |
| 2,228,639 | Miller | Jan. 14, 1941 |
| 2,927,990 | Johnson | Mar. 8, 1960 |
| 3,022,413 | Johnson | Feb. 20, 1962 |